United States Patent
Oshita et al.

(10) Patent No.: US 12,447,985 B2
(45) Date of Patent: Oct. 21, 2025

(54) DRIVING ASSISTANCE DEVICE AND DRIVING ASSISTANCE METHOD

(71) Applicant: ISUZU MOTORS LIMITED, Yokohama (JP)

(72) Inventors: Wasantha Oshita, Fujisawa (JP); Satoshi Hayashi, Fujisawa (JP); Masaichi Takahashi, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 47 days.

(21) Appl. No.: 18/277,292

(22) PCT Filed: Feb. 18, 2022

(86) PCT No.: PCT/JP2022/006740
§ 371 (c)(1),
(2) Date: Aug. 15, 2023

(87) PCT Pub. No.: WO2022/181497
PCT Pub. Date: Sep. 1, 2022

(65) Prior Publication Data
US 2024/0140465 A1 May 2, 2024

(30) Foreign Application Priority Data
Feb. 25, 2021 (JP) ................ 2021-028716

(51) Int. Cl.
*B60Q 1/00* (2006.01)
*B60W 30/16* (2020.01)
*B60W 50/14* (2020.01)

(52) U.S. Cl.
CPC ............ *B60W 50/14* (2013.01); *B60W 30/16* (2013.01); *B60W 2050/143* (2013.01);
(Continued)

(58) Field of Classification Search
CPC ................ B60W 50/14; B60W 30/16; B60W 2050/143; B60W 2050/146; B60W 2554/4041; B60W 2554/802
(Continued)

(56) References Cited

U.S. PATENT DOCUMENTS

2017/0217436 A1* 8/2017 Inomata ................ B60W 30/09
2018/0151073 A1* 5/2018 Minemura ............. G08G 1/166
(Continued)

FOREIGN PATENT DOCUMENTS

JP 07-017295 A 1/1995
JP 2003-019935 A 1/2003
(Continued)

OTHER PUBLICATIONS

PCT Search Report for International Application No. PCT/JP2022/006740 mailed Apr. 5, 2022, 5 pp.
(Continued)

*Primary Examiner* — Anh V La
(74) *Attorney, Agent, or Firm* — The Roy Gross Law Firm, LLC; Roy D. Gross

(57) ABSTRACT

This driving assistance device comprises: an inter-vehicle distance detection unit which detects an inter-vehicle distance from an own vehicle to a preceding vehicle; an overlap detection unit which detects an overlap (a collision avoidance width) of the own vehicle and the preceding vehicle; and an alarm control unit which controls an alarm output from an information output unit on the basis of the inter-vehicle distance and a change in the overlap.

6 Claims, 5 Drawing Sheets

(52) U.S. Cl.
CPC .......... *B60W 2050/146* (2013.01); *B60W 2554/4041* (2020.02); *B60W 2554/802* (2020.02)

(58) Field of Classification Search
USPC .......... 340/425.5, 435, 436, 903, 904
See application file for complete search history.

(56) References Cited

U.S. PATENT DOCUMENTS

| | | | |
|---|---|---|---|
| 2018/0154892 A1* | 6/2018 | Tamura | G06V 20/56 |
| 2018/0162392 A1* | 6/2018 | Takaki | B60W 10/18 |
| 2020/0039510 A1* | 2/2020 | Kume | B60W 30/09 |

FOREIGN PATENT DOCUMENTS

| | | |
|---|---|---|
| JP | 2009-139320 A | 6/2009 |
| JP | 2014-031086 A | 2/2014 |
| JP | 2017-045368 A | 3/2017 |
| JP | 2018-052415 A | 4/2018 |

OTHER PUBLICATIONS

PCT Written Opinion for International Application No. PCT/JP2022/006740 mailed Apr. 5, 2022, 4 pp.

\* cited by examiner

DRIVING ASSISTANCE DEVICE AND DRIVING ASSISTANCE METHOD

CROSS REFERENCE TO RELATED APPLICATIONS

This application is a National Phase of PCT Patent Application No. PCT/JP2022/006740 having International filing date of Feb. 18, 2022, which claims the benefit of priority of Japanese Patent Application No. 2021-028716, filed Feb. 25, 2021, the contents of which are all incorporated herein by reference in their entirety.

TECHNICAL FIELD

The present disclosure relates to a driving assistance apparatus and a driving assistance method each assisting the driving of a vehicle.

BACKGROUND ART

In recent years, as one technology of assisting the driving of a vehicle, adaptive cruise control (hereinafter referred to as "ACC") has been attracting attention (for example, see Patent Literature (hereinafter referred to as "PTL") 1). The ACC is a technology of acquiring the vehicle velocity of a host vehicle, the relative velocity of a preceding vehicle with respect to the host vehicle, the inter-vehicle distance between the host vehicle and the preceding vehicle, and the like, and controlling the driving system and braking system of the host vehicle such that the host vehicle velocity and the inter-vehicle distance between the host vehicle and the preceding vehicle are maintained constant.

Note that, in the ACC, cruise control such that the velocity of a host vehicle is controlled to be a set vehicle velocity that is set in advance is generally performed in a case where there is no preceding vehicle.

In addition, there is a forward collision warning (FCW) function as a part of the ACC function or as a function separate from the ACC function. The FCW is the function of detecting a preceding vehicle at all times and, in a case where there is an increased danger of collision, to urge the driver to perform an avoidance operation by outputting an alarm to the driver. The FCW function may be used in combination with the ACC function or may be used alone.

CITATION LIST

Patent Literature

PTL 1
Japanese Patent Application Laid-Open No. H07-17295

SUMMARY OF INVENTION

Technical Problem

Incidentally, the FCW suitably functions for the driver when traveling on a straight road or the like, but may cause the driver to feel troublesome at an intersection or the like.

For example, in a case where a preceding vehicle turns right or left and a host vehicle travels straight, the inter-vehicle distance actually becomes shorter, but it is not a dangerous situation since the preceding vehicle immediately moves in the left or right direction with respect to the forward direction of the host vehicle. Nonetheless, when an alarm is outputted, the driver feels the output troublesome.

The present disclosure has been made in view of the points described above and provides a driving assistance apparatus and a driving assistance method each capable of suppressing, while outputting an appropriate alarm to the driver, an output of an alarm that is troublesome for the driver.

Solution to Problem

An aspect of a driving assistance apparatus of the present disclosure is a driving assistance apparatus that assists driving of a vehicle. The driving assistance apparatus includes: an inter-vehicle distance detection section that detects an inter-vehicle distance between a host vehicle and a preceding vehicle; an overlap detection section that detects an overlap between the host vehicle and the preceding vehicle; and an alarm control section that controls an alarm outputted from an information output section, based on the inter-vehicle distance and a change in the overlap.

An aspect of a driving assistance method of the present disclosure is a driving assistance method of assisting driving of a vehicle. The driving assistance method includes: detecting an inter-vehicle distance between a host vehicle and a preceding vehicle; detecting an overlap between the host vehicle and the preceding vehicle; and controlling an alarm outputted from an information output section, based on the inter-vehicle distance and a change in the overlap.

Advantageous Effects of Invention

According to the present disclosure, an overlap between a host vehicle and a preceding vehicle is detected and an alarm is controlled based on an inter-vehicle distance between the host vehicle and the preceding vehicle and a change in the overlap, and thus, it is possible to suppress, while outputting an appropriate alarm to the driver, an output of an alarm that is troublesome for the driver.

DESCRIPTION OF EMBODIMENTS

Hereinafter, an embodiment of the present invention will be described in detail with reference to the accompanying drawings.

<1> CONFIGURATION OF VEHICLE

First, the configuration of a vehicle including a driving assistance apparatus according to an embodiment of the present disclosure will be described.

Figure 1:
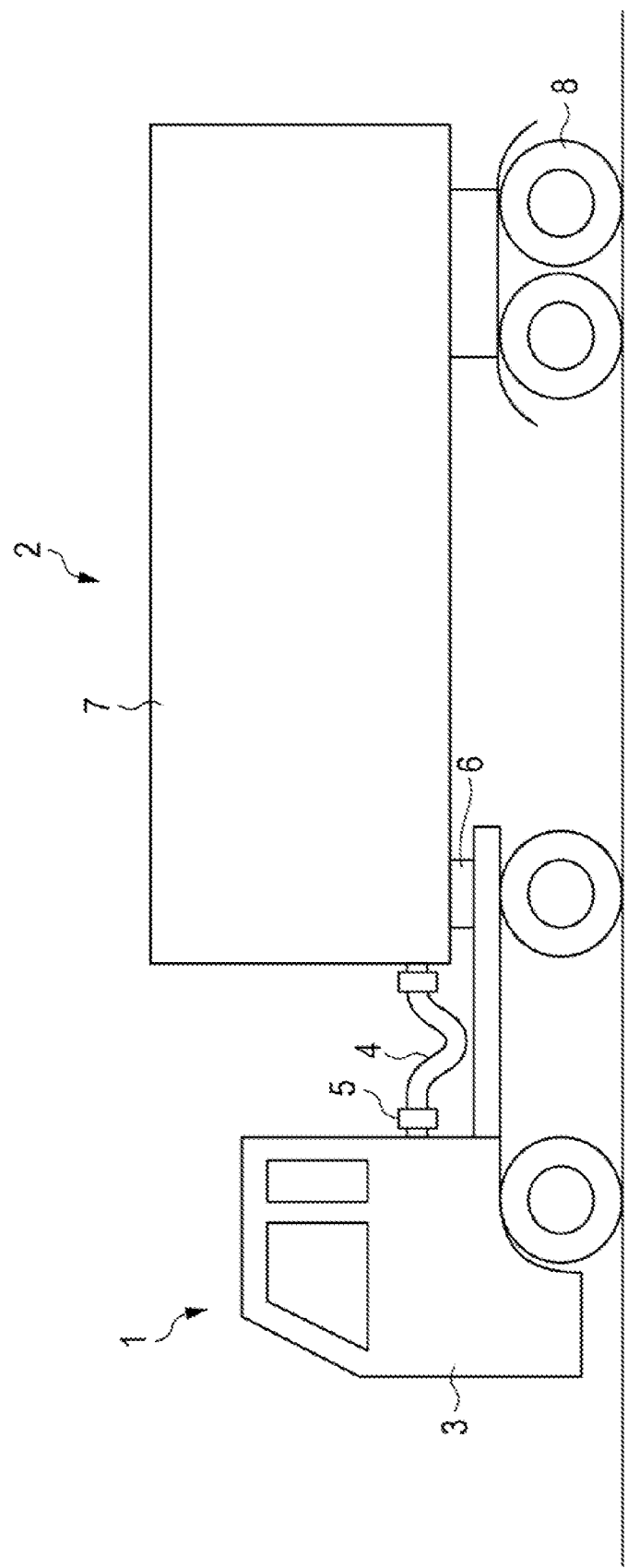
FIG. 1 is an external view illustrating an example of a vehicle to which a driving assistance apparatus is applied according to an embodiment.

FIG. 1 is an external view illustrating an example of vehicle 1 to which a driving assistance apparatus is applied according to the present embodiment. Further, FIG. 2 is a block diagram illustrating the configuration of vehicle 1.

Note that, illustration and description here will be made by focusing on portions in relation to the driving assistance apparatus.

As illustrated in FIG. 1, vehicle 1 is a tractor head (traction vehicle) capable of pulling trailer 2 coupled to the tractor head. Vehicle 1 includes vehicle main-body portion 3 including a power system such as an engine and driving wheels and a driver's seat, and trailer 2 that is coupled to vehicle main-body portion 3.

Figure 2:
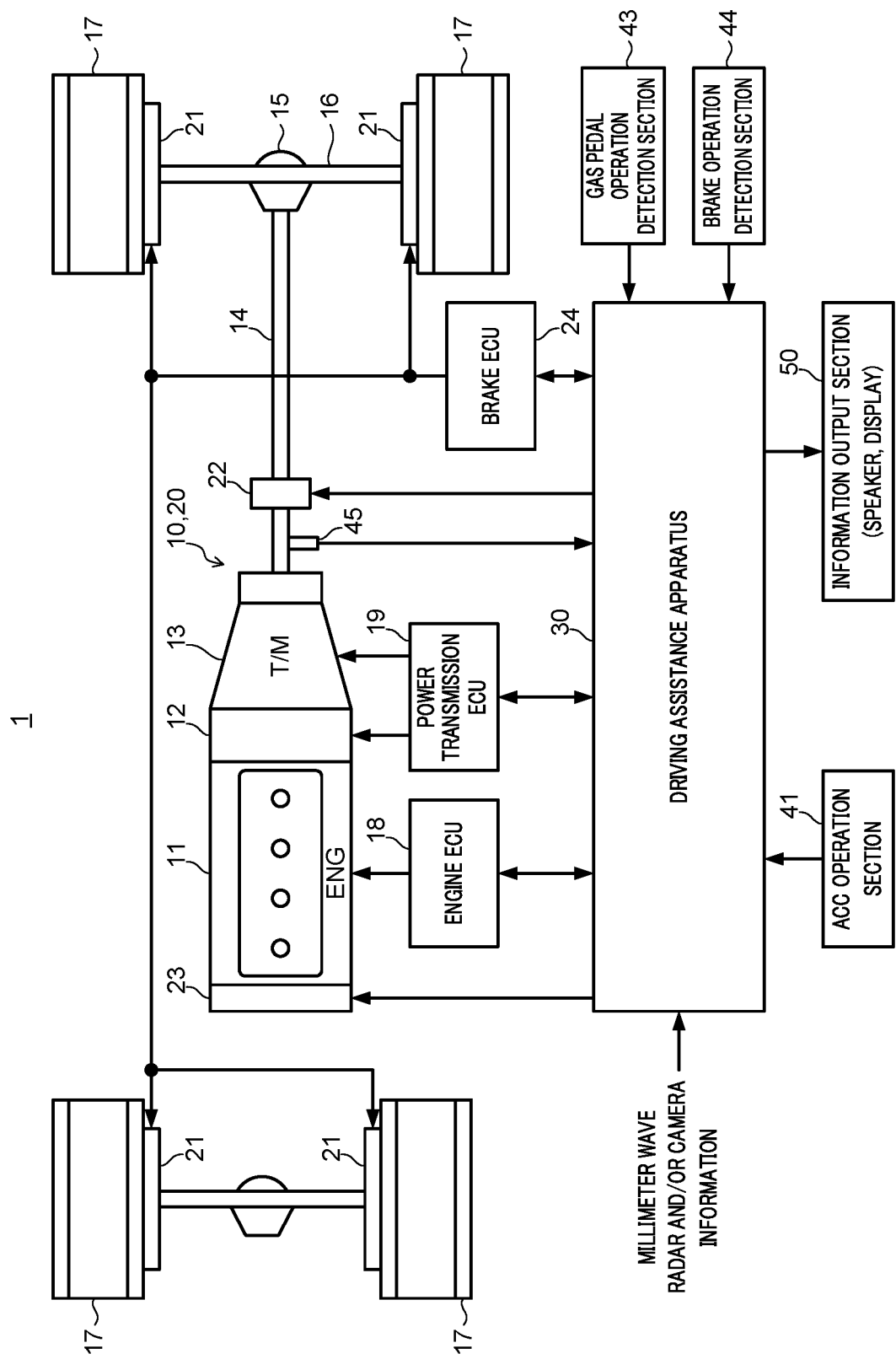
FIG. 2 is a block diagram illustrating the configuration of the vehicle of the embodiment.
Figure 3:
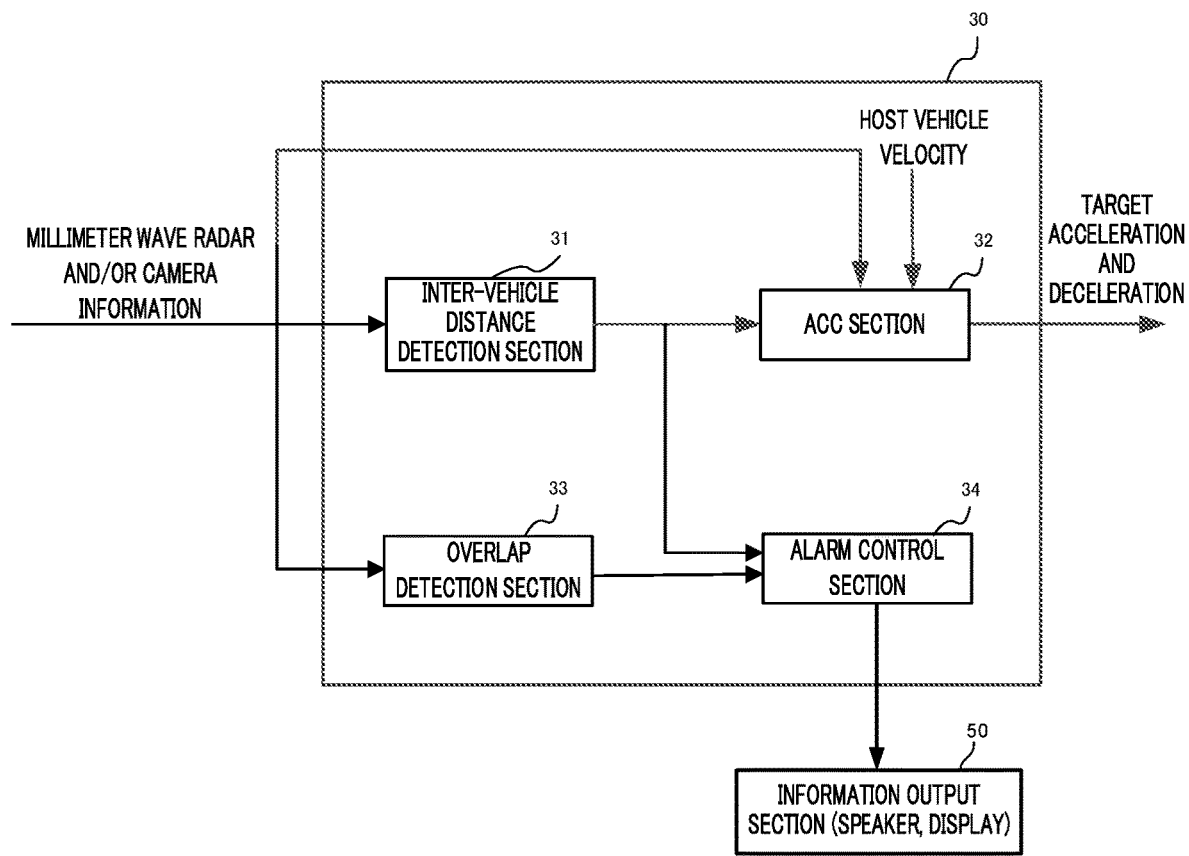
FIG. 3 is a block diagram illustrating the configuration of the driving assistance apparatus.

As illustrated in FIG. 2, vehicle 1 includes driving system 10 that causes vehicle 1 to travel, braking system 20 that decelerates vehicle 1, driving assistance apparatus 30 that assists the driver in driving vehicle 1, and the like.

Driving system 10 includes engine 11, clutch 12, transmission 13, propeller shaft 14, differential gear 15, drive shaft 16, wheels 17, engine ECU 18, and power transmission ECU 19.

Engine ECU 18 and power transmission ECU 19 are connected to driving assistance apparatus 30 by an in-vehicle network such as a controller area network (CAN), and engine ECU 18 and power transmission ECU 19, and driving assistance apparatus 30 are capable of transmitting and receiving necessary data and a control signal to and from each other. Engine ECU 18 controls an output of engine 11 in accordance with a drive command from driving assistance apparatus 30. Power transmission ECU 19 controls the connection and disconnection of clutch 12 and the velocity change of transmission 13 in accordance with a drive command from driving assistance apparatus 30.

The power of engine 11 is transmitted to transmission 13 via clutch 12. The power transmitted to transmission 13 is further transmitted to wheels 17 via propeller shaft 14, differential gear 15, and drive shaft 16. Thus, the power of engine 11 is transmitted to wheels 17, and vehicle 1 travels.

Braking system 20 includes service brakes 21, auxiliary brakes 22 and 23, a parking brake (not illustrated), and brake ECU 24.

Service brake 21 is a brake that is generally referred to as a main brake, a friction brake, a foot brake, a foundation brake, or the like. Service brake 21 is a drum brake that obtains a braking force by pressing a brake lining against the inner side of a drum that rotates with wheel 17, for example.

Auxiliary brake 22 is a retarder (hereinafter referred to as "retarder 22") that obtains a braking force by directly giving a load to the rotation of propeller shaft 14, and is an electromagnetic retarder, for example. Auxiliary brake 23 is an exhaust brake (hereinafter referred to as "exhaust brake 23") that enhances the effect of an engine brake by utilizing the rotational resistance of an engine. By providing retarder 22 and exhaust brake 23, a braking force can be increased and the frequency of use of service brake 21 is reduced. Accordingly, wear of a brake lining or the like can be suppressed.

Brake ECU 24 is connected to driving assistance apparatus 30 by an in-vehicle network such as a CAN, and brake ECU 24 and driving assistance apparatus 30 are capable of transmitting and receiving necessary data and a control signal to and from each other. Brake ECU 24 controls the braking force of service brake 21 (the brake fluid pressure of a wheel cylinder of wheel 17) in accordance with a braking command from driving assistance apparatus 30.

The braking operation of service brake 21 is controlled by driving assistance apparatus 30 and brake ECU 24. The braking operation of retarder 22 and exhaust brake 23 is controlled on/off by driving assistance apparatus 30. Since the braking force of retarder 22 and exhaust brake 23 is substantially fixed, service brake 21 capable of finely adjusting the braking force is suitable in a case where a desired braking force is accurately generated.

Information from a millimeter wave radar and/or a camera is inputted to driving assistance apparatus 30. The information from the millimeter wave radar and/or the camera is information indicating a traffic situation and a road situation ahead of the vehicle. Further, driving assistance apparatus 30 includes ACC operation section 41, gas pedal operation detection section 43, brake operation detection section 44, and the like.

Driving assistance apparatus 30 forms control signals for controlling the operations of driving system 10 and braking system 20. Specifically, driving assistance apparatus 30 determines target acceleration and deceleration for realizing the ACC and outputs the target acceleration and deceleration to engine ECU 18, power transmission ECU 19, and brake ECU 24 as appropriate.

Note that, although not illustrated, each of engine ECU 18, power transmission ECU 19, brake ECU 24, and driving assistance apparatus 30 includes a central processing unit (CPU), a storage medium such as a read only memory (ROM) in which a control program is stored, a working memory such as a random access memory (RAM), and a communication circuit, for example. In this case, for example, the functions of sections to be described later that configure driving assistance apparatus 30 are realized by the CPU executing a control program. Note that, all or some of engine ECU 18, power transmission ECU 19, brake ECU 24, and driving assistance apparatus 30 may be integrally configured.

ACC operation section 41 includes an ACC ON/OFF switch for activating and releasing the ACC. Further, ACC operation section 41 includes a setting switch for setting various settings of the ACC. The driver can set a target inter-vehicle distance and a target host vehicle velocity, for example, by operating the setting switch. Note that, those switches may be implemented with a user interface displayed on a display with a touch screen.

Gas pedal operation detection section 43 detects a depression amount of the gas pedal and outputs the detection result to driving assistance apparatus 30. Driving assistance apparatus 30 transmits drive commands to engine ECU 18 and power transmission ECU 19 based on the depression amount of the gas pedal.

Brake operation detection section 44 detects a depression amount of the brake pedal for operating service brake 21. Further, brake operation detection section 44 detects whether an auxiliary brake lever that operates retarder 22 or exhaust brake 23 has been operated. Brake operation detection section 44 then outputs the detection result regarding the brake pedal and the auxiliary brake lever to driving assistance apparatus 30. Driving assistance apparatus 30 transmits a braking command to brake ECU 24 based on the depression amount of the brake pedal. Further, driving assistance apparatus 30 controls the ON/OFF operation of retarder 22 or exhaust brake 23 based on the operation of the auxiliary brake lever.

Further, driving assistance apparatus 30 outputs various information on traveling and the ACC from information output section 50. For example, a display and/or a sound that indicate(s) that the ACC is in operation or that the ACC has been released is outputted from information output section 50. Further, in a case where there is an increased danger of collision with a preceding vehicle, information output section 50 outputs an inter-vehicle caution alarm to the driver.

<2> CONFIGURATION OF DRIVING ASSISTANCE APPARATUS ACCORDING TO PRESENT EMBODIMENT

Driving assistance apparatus 30 includes inter-vehicle distance detection section 31, ACC section 32, overlap detection section 33, and alarm control section 34.

Inter-vehicle distance detection section 31 measures (detects) an inter-vehicle distance between host vehicle 1 and a preceding vehicle based on information on ahead of host vehicle 1 obtained by a millimeter wave radar, a camera, and/or the like, and outputs the measurement result to ACC section 32 and alarm control section 34. Note that, inter-vehicle distance detection section 31 may measure an inter-vehicle distance based on information from other sensors such as a laser radar.

ACC section 32 realizes automatic following control by outputting target acceleration and deceleration for causing a host vehicle to follow a preceding vehicle based on the relative velocity and inter-vehicle distance between the host vehicle and the preceding vehicle. Further, in a case where no preceding vehicle is present, ACC section 32 realizes constant velocity traveling control by outputting a target acceleration for causing the velocity of a host vehicle to be a set constant velocity.

The automatic following control is control such that in a case where a preceding vehicle is present in a predetermined range, driving system 10 and braking system 20 are operated to cause the inter-vehicle distance to be within a predetermined target range and to cause the relative velocity to approach zero. The constant velocity traveling control is control such that driving system 10 and braking system 20 are operated to cause the traveling velocity of vehicle 1 to approach a predetermined target value in a case where no preceding vehicle is present in a predetermined range.

Overlap detection section 33 detects an overlap between a host vehicle and a preceding vehicle.

Figure 4:
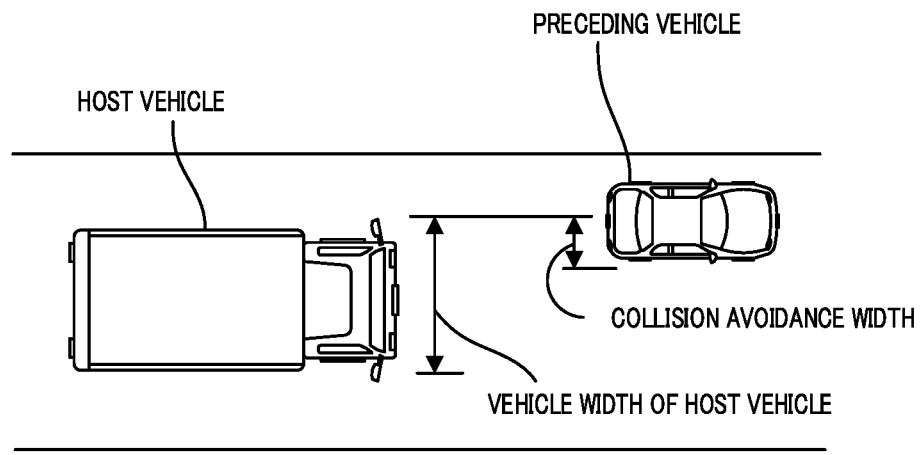
FIG. 4 is a diagram provided for describing an overlap.

FIG. 4 is a diagram provided for describing an overlap that is detected by overlap detection section 33. FIG. 4 illustrates a host vehicle and a preceding vehicle that is present ahead of the host vehicle and is closest to the host vehicle. As illustrated in the drawing, the overlap between the host vehicle and the preceding vehicle corresponds to a collision avoidance width. Further, an overlap ratio can also be defined as the overlap ratio=the collision avoidance width÷the vehicle width of the host vehicle.

Overlap detection section 33 is capable of detecting an overlap (a collision avoidance width) from millimeter wave radar and/or camera information. Further, overlap detection section 33 is also capable of calculating an overlap ratio from an overlap and the vehicle width of a host vehicle.

An inter-vehicle distance between a host vehicle and a preceding vehicle, which is obtained by inter-vehicle distance detection section 31, and an overlap between the host vehicle and the preceding vehicle, which is obtained by overlap detection section 33, are inputted to alarm control section 34, and alarm control section 34 outputs a control signal to information output section 50, based on the inter-vehicle distance and a change in the overlap.

Information output section 50 outputs an inter-vehicle caution alarm (hereinafter simply referred to as "alarm") with a sound and/or a display based on the control signal from alarm control section 34.

<3> OPERATION OF DRIVING ASSISTANCE APPARATUS

Figure 5:
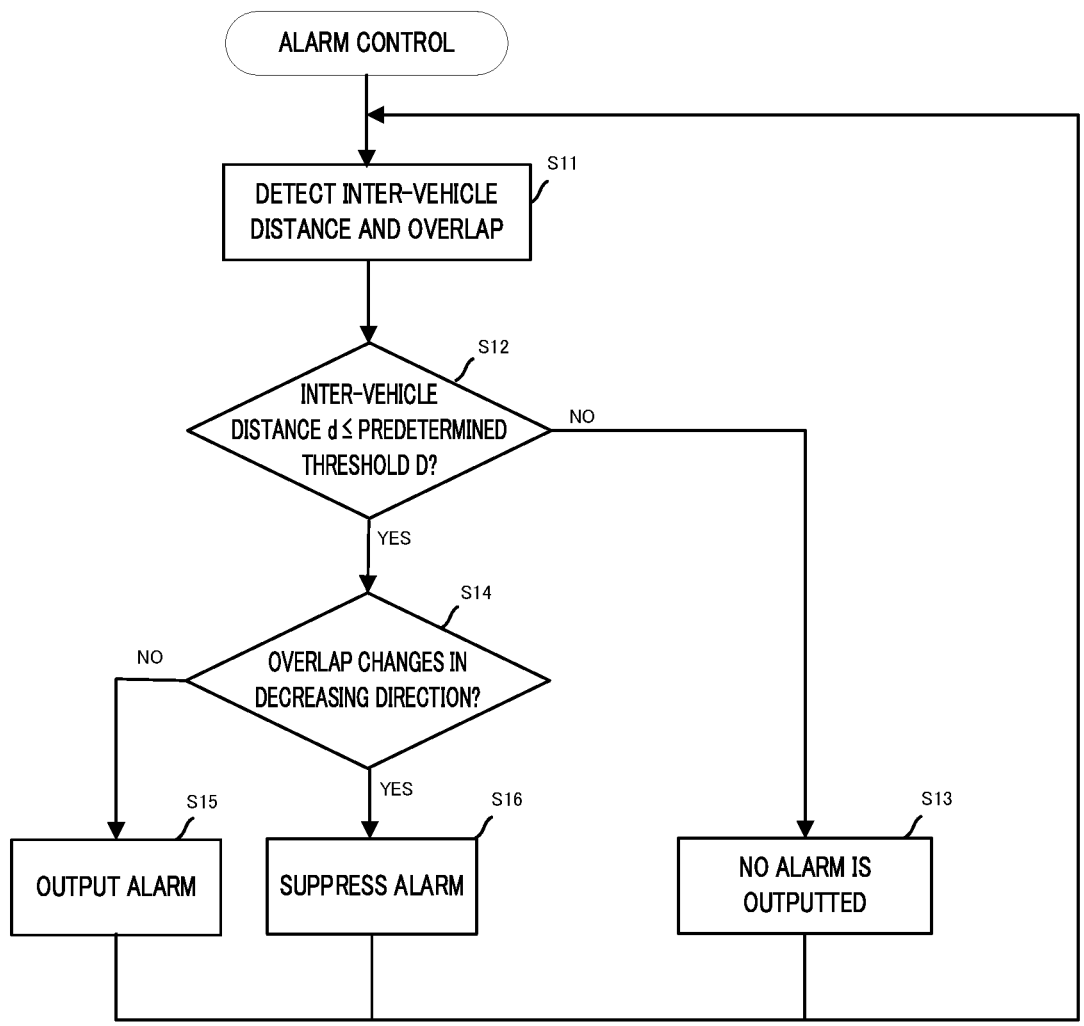
FIG. 5 is a flowchart provided for describing alarm control according to the embodiment.

Next, an operation of driving assistance apparatus 30 will be described. Driving assistance apparatus 30 of the present embodiment is characterized in particular by alarm control. Accordingly, here, the alarm control will be mainly described with reference to the flowchart of FIG. 5.

In step S11, driving assistance apparatus 30 causes inter-vehicle distance detection section 31 to detect an inter-vehicle distance and causes overlap detection section 33 to detect an overlap. In S12 subsequent thereto, alarm control section 34 determines whether inter-vehicle distance d between a host vehicle and a preceding vehicle is equal to or less than predetermined inter-vehicle distance D.

In a case where inter-vehicle distance d is greater than predetermined threshold D (step S12; NO), alarm control section 34 transitions to step S13 and controls information output section 50 such that no alarm is outputted.

In a case where inter-vehicle distance d is equal to or less than predetermined threshold D (step S12; YES), on the other hand, alarm control section 34 transitions to processing in step S14 and determines whether the overlap changes in a decreasing direction. For example, alarm control section 34 acquires overlaps per second, and compares an overlap before one second and a current overlap. When the current overlap is less than the overlap before one second, alarm control section 34 determines that the overlap decreases.

In a case where alarm control section 34 determines that the overlap has not changed in the decreasing direction (step S14; NO), alarm control section 34 transitions to step S15 and controls information output section 50 such that an alarm is outputted. Thus, information output section 50 outputs a sound and/or an image that indicate(s) to the driver that the host vehicle is close to the preceding vehicle.

In a case where alarm control section 34 determines that the overlap has changed in the decreasing direction (step S14; YES), on the other hand, alarm control section 34 transitions to step S16 and performs control such that an alarm that is outputted from information output section 50 is suppressed. For example, alarm control section 34 performs control in step S16 such that no alarm is outputted from information output section 50. Alternatively, alarm control section 34 may perform control in step S16 such that the level of an alarm that is outputted from information output section 50 is reduced. For example, alarm control section 34 may perform control such that the audio level and/or display level of an alarm is/are reduced than an alarm that is outputted in step S15.

As descried above, even in a case where an inter-vehicle distance is equal to or less than a threshold value and an overlap changes in a decreasing direction, alarm suppression makes it possible to suppress an output of an alarm which is troublesome for the driver.

Here, for example, it is assumed that a preceding vehicle turns right or left and a host vehicle travels straight. In this case, in general, the velocity of the preceding vehicle that turns right or left is relatively slower than the velocity of the host vehicle that travels straight, and thus, the inter-vehicle distance becomes smaller. Nevertheless, although the inter-vehicle distance becomes shorter, it is not a dangerous situation since the preceding vehicle immediately moves in the right or left direction with respect to the forward direction of the host vehicle. Nonetheless, when an alarm is outputted, the driver feels the output troublesome.

In view of the above, even in a case where an inter-vehicle distance is equal to or less than a threshold value and an overlap changes in a decreasing direction, the present embodiment performs alarm suppression and therefore makes it possible to suppress an output of an alarm which is troublesome for the driver. That is, in a case where a preceding vehicle turns left or right, an overlap changes in a decreasing direction, and thus, a troublesome alarm is suppressed.

<4> EFFECTS OF EMBODIMENT

As described above, the present embodiment makes it possible to realize driving assistance apparatus 30 that includes: inter-vehicle distance detection section 31 that detects inter-vehicle distance d between a host vehicle and a preceding vehicle; overlap detection section 33 that detects an overlap (a collision avoidance width) of the host vehicle and the preceding vehicle; and alarm control section 34 that controls an alarm outputted from information output section 50, based on inter-vehicle distance d and a change in the overlap, whereby driving assistance apparatus 30 is capable of suppressing, while outputting an appropriate alarm to the driver, an output of an alarm that is troublesome for the driver.

<5> OTHER EMBODIMENTS

The embodiment described above is only illustration of an exemplary embodiment for implementing the present invention, and the technical scope of the present invention shall not be construed limitedly thereby. That is, the present invention can be implemented in various forms without departing from the gist or the main features thereof.

(1) As described above, since an overlap and an overlap ratio have a proportional relationship, it is possible to obtain the same effect as in the embodiment described above by replacing the overlap in the embodiment described above with overlap ratio and implementing the present invention.

(2) In the embodiment described above, an output of an alarm is suppressed in a case where an overlap changes in a decreasing direction, but it may be configured, contrary to the above, such that an output of an alarm is increased in a case where am overlap changes in an increasing direction.

(3) It may be configured such that in a case where an overlap changes in a decreasing direction, alarm control section 34 suppresses an output of an alarm, and in a case where an overlap changes in an increasing direction while the output of the alarm is suppressed, alarm control section 34 stops suppressing the output of the alarm. Note that, it may be configured such that the alarm suppression is released after a lapse of a predetermined period of time.

In this way, when a preceding vehicle once moves in the left or right direction with respect to a host vehicle and then returns in the forward direction of the host vehicle, the alarm suppression is stopped. As a result, even an alarm is once suppressed, the alarm is properly restored according to situations, and thus, security is ensured.

Further, it may be configured such that overlap detection section 33 detects an overlap between a host vehicle and each of a plurality of preceding vehicles, and in a case where an overlap between the host vehicle and a first preceding vehicle of the plurality of preceding vehicles changes in a decreasing direction, alarm control section 34 suppresses an output of an alarm, and in a case where an overlap between the host vehicle and a second preceding vehicle of the plurality of preceding vehicles, where the second preceding vehicle differs from the first preceding vehicle, changes in an increasing direction while the output of the alarm is suppressed, alarm control section 34 stops suppressing the output of the alarm. In this way, when a first preceding vehicle once moves in the left or right direction with respect to a host vehicle and then a second preceding vehicle, which differs from the first preceding vehicle, changes lanes and moves in the front direction of the host vehicle, the alarm suppression is stopped. As a result, even an alarm is once suppressed, the alarm is properly restored according to situations, and thus, security is ensured.

(4) In the embodiment described above, a case where an overlap is directly detected based on millimeter wave radar and/or camera information. Nonetheless, it may be configured such that for example, in a case where a host vehicle is traveling on a curved road, overlap detection section 33 estimates an estimated arrival position of the host vehicle based on a shape of the road on which the host vehicle is traveling, and detects an overlap based on a lateral position of the estimated arrival position and a lateral position of a preceding vehicle.

The disclosure of Japanese Patent Application No. 2021-028716, filed on Feb. 25, 2021, including the specification, drawings and abstract, is incorporated herein by reference in its entirety.

INDUSTRIAL APPLICABILITY

The driving assistance apparatus and the driving assistance method of the present disclosure are widely applicable to a driving assistance apparatus and a driving assistance method each of which has the forward collision warning function.

REFERENCE SIGNS LIST

1 Vehicle (host vehicle)
2 Trailer
3 Vehicle main-body portion
10 Driving system
11 Engine
12 Clutch
13 Transmission
14 Propeller shaft
15 Differential gear
16 Drive shaft
17 Wheel
18 Engine ECU
19 Power transmission ECU
20 Braking system
21 Service brake
22 Retarder
23 Exhaust brake
24 Brake ECU
30 Driving assistance apparatus
31 Inter-vehicle di stance detection section
32 ACC section
33 Overlap detection section
34 Alarm control section
50 Information output section

The invention claimed is:

1. A driving assistance apparatus that assists driving of a vehicle, the driving assistance apparatus comprising:
an inter-vehicle distance detection section that detects an inter-vehicle distance between a host vehicle and a preceding vehicle;
an overlap detection section that detects an overlap between the host vehicle and the preceding vehicle; and an alarm control section that controls an alarm outputted on a display, based on the inter-vehicle distance and a change in the overlap, wherein:

the overlap detection section detects the overlap between the host vehicle and each of a plurality of the preceding vehicles, and in a case where the overlap between the host vehicle and a first preceding vehicle of the plurality of preceding vehicles changes in a decreasing direction, the alarm control section suppresses an output of the alarm, and in a case where the overlap between the host vehicle and a second preceding vehicle of the plurality of preceding vehicles changes in an increasing direction while the output of the alarm is suppressed, the alarm control section stops suppressing the output of the alarm, the second preceding vehicle differing from the first preceding vehicle.

2. The driving assistance apparatus according to claim 1, wherein in a case where the overlap changes in a decreasing direction, the alarm control section suppresses an output of the alarm.

3. The driving assistance apparatus according to claim 1, wherein in a case where the overlap changes in a decreasing direction, the alarm control section suppresses an output of the alarm, and in a case where the overlap changes in an increasing direction while the output of the alarm is suppressed, the alarm control section stops suppressing the output of the alarm.

4. The driving assistance apparatus according to claim 1, wherein the overlap detection section estimates an estimated arrival position of the host vehicle based on a shape of a road on which the host vehicle is traveling, and detects the overlap based on a lateral position of the estimated arrival position and a lateral position of the preceding vehicle.

5. A driving assistance method of assisting driving of a vehicle, the driving assistance method comprising:

detecting an inter-vehicle distance between a host vehicle and a preceding vehicle;

detecting an overlap between the host vehicle and the preceding vehicle; and controlling an alarm outputted on a display, based on the inter-vehicle distance and a change in the overlap, further comprising:

detecting the overlap between the host vehicle and each of a plurality of the preceding vehicles, and in a case where the overlap between the host vehicle and a first preceding vehicle of the plurality of preceding vehicles changes in a decreasing direction, suppressing an output of the alarm, and in a case where the overlap between the host vehicle and a second preceding vehicle of the plurality of preceding vehicles changes in an increasing direction while the output of the alarm is suppressed, stopping suppressing the output of the alarm, the second preceding vehicle differing from the first preceding vehicle.

6. A driving assistance apparatus that assists driving of a vehicle, the driving assistance apparatus comprising:

an inter-vehicle distance detection section that detects an inter-vehicle distance between a host vehicle and a preceding vehicle;

an overlap detection section that detects an overlap between the host vehicle and the preceding vehicle; and an alarm control section that controls an alarm outputted on a display, based on the inter-vehicle distance and a change in the overlap, wherein:

the overlap detection section estimates an estimated arrival position of the host vehicle based on a shape of a road on which the host vehicle is traveling, and detects the overlap based on a lateral position of the estimated arrival position and a lateral position of the preceding vehicle.

\* \* \* \* \*